United States Patent [19]

Adams et al.

[11] 3,714,046
[45] Jan. 30, 1973

[54] METAL-WORKING FLUID CONTAINING A 2,4,5-TRICHLOROANILINE DERIVATIVE AS A MICROBIOCIDE

[75] Inventors: Phillip Adams, Murray Hill; Alfonso N. Petrocci, Glen Rock; John J. Merianos, Jersey City, all of N.J.

[73] Assignee: Millmaster Onyx Corporation, New York, N.Y.

[22] Filed: March 19, 1971

[21] Appl. No.: 126,333

Related U.S. Application Data

[62] Division of Ser. No. 875,499, Nov. 10, 1969.

[52] U.S. Cl............252/51.5 R, 252/49.3, 252/51, 260/570.5 R, 260/570.5 PA
[51] Int. Cl........C10m 1/20, C10m 1/30, C10m 1/32
[58] Field of Search...252/49.3, 51, 51.5 R, 570.5 R, 252/570.5 PA

[56] References Cited

UNITED STATES PATENTS

| 2,248,925 | 7/1941 | Lincoln et al. | 252/51 |
| 3,228,829 | 1/1966 | Wolf et al. | 252/51 X |

Primary Examiner—Daniel E. Wyman
Assistant Examiner—W. J. Shine
Attorney—Arthur A. Jacobs

[57] ABSTRACT

Derivatives of 2,4,5-trichloroaniline having the general formula:

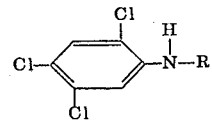

wherein R is the residue of an aliphatic, alicyclic, aromatic or arylaliphatic compound. These derivatives possess marked anti-microbial power.

1 Claim, No Drawings

METAL-WORKING FLUID CONTAINING A 2,4,5-TRICHLOROANILINE DERIVATIVE AS A MICROBIOCIDE

This is a division of co-pending application, Ser. No. 875,499, filed Nov. 10, 1969 and relates to new compositions of matter, comprising certain derivatives of 2,4,5-trichloroaniline having the general formula:

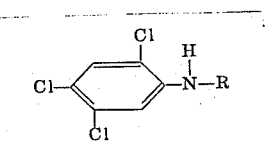

wherein R is the residue of an aliphatic, alicyclic, aromatic or arylaliphatic compound, the said derivatives possessing marked anti-microbial power, and to a process for manufacturing them, as well as to their application to various substrates for the purpose of suppressing the growth of microorganisms.

Thus, the products may be used for the treatment of water, both when used as a coolant, as in cooling towers, air-conditioners, humidifiers and dehumidifiers, and the like; and when used as process water, for example, in paper making and the like, to prevent the proliferation of microorganisms therein. They may also be used for the preservation of metal-working fluids by preventing the microbial action which causes putrefaction, phase separation and the like, as well as dermatitis resulting from the handling of contaminated fluids. They may also be used as preservatives for cosmetics to prevent discoloration, phase separation and breaking of emulsions and putrefaction, and also to prevent the growth of pathogenic microorganisms therein.

The products of the invention may be prepared by the interaction of 1,2,4,5-tetrachlorobenzene with amines to form substituted 2,4,5-trichloroanilines. The products so obtained may in some cases be used in the crude form. However, it is usually preferable to recover them substantially pure by means of distillation under reduced pressure.

The following examples are intended to illustrate the invention but not to limit it except as claimed.

EXAMPLE 1

432 grams or two mols of 1,2,4,5-tetrachlorobenzene and 825 grams, or about 8 mols, of dimethylaminopropylamine were charged along with 7 grams of cuprous chloride into a pressure vessel. The mixture was heated under agitation at 190°–200° C. and a pressure of about 100 psi gauge for a period of about 16 hours. Temperatures appreciably higher than 200° C. tend to cause some decomposition with the evolution of ammonia.

The reaction mass was cooled to about 120° C. and discharged. At about 50° C. the greater part of the unreacted tetrachlorobenzene was removed by filtration.

The filtrate was transferred to a distillation flask fitted with an air condenser, and excess unreacted amine was distilled off at a pot temperature up to 100° C. at 20 mm pressure. The distillation was continued; at 140° C. and 5 mm pressure, tetrachlorobenzene began to distill off and crystallize in the still head, whence it was driven by heating, and collected in a receiving flask.

The residue was cooled and drowned in water and aqueous caustic soda was added to pH 12. The oil that separated was extracted with methylene chloride and washed twice with water. The extract was transferred to a distilling flask and heated under reduced pressure, removing water and methylene chloride and then tetrachlorobenzene. The product, 3-(2,4,5-trichloroanilino)-1,1-di-methylaminopropane distilled over as a colorless liquid and yielded 50 percent of the theoretical amount. It had a boiling point of 180°–185° C. at 2 mm. pressure.

By obtaining an average of (1) direct potentiometric titration (first break) and (2) indicator titration in non-aqueous medium with standard acid, it assayed 99.3 percent.

EXAMPLE 2

In a manner similar to and in the pressure vessel of Example 1, 432 grams or two mols of 1,2,4,5 tetrachlorobenzene was reacted with 600 grams or about 10 mols of ethylene diamine in the presence of 7 grams of cuprous chloride, at 180°–190° C. for a period of 6 hours at 90 psi gauge pressure.

After cooling, most of the unreacted tetrachlorobenzene was filtered off. The filtrate was transferred to a distilling flask, and more than half of the residual ethylene diamine was distilled off. The residue was drowned in water and treated with aqueous caustic soda until it had a pH of about 12. A brown oil separated as crude trichloroanilinoethylamine.

For a purer product, the oil was distilled in vacuo at 185°–205° C. and 2-3 mm. pressure as a yellow oil, after first topping the charge to remove amine and tetrachlorobenzene. The product yielded 258 grams or about 55 percent of theory. On standing it set to a white solid, as 2,4,5 trichloroanilinoethylamine, melting at 93°–94 C. Equivalent weight by titration was 240 (239.5 theory) and it analyzed 45.6 percent Cl and 11.0% N (theory being 44.5% and 11.7% respectively).

EXAMPLE 3

Using the methods of Examples 1 and 2, the compound 1,2,4,5-tetrachlorobenzene was reacted with the following amino compounds: hexylamine, octylamine, nonylamine, decylamine, dodecylamine, tetradecylamine, hexadecylamine, octadecylamine, octadecenylamine, diethylene triamine, triethylene tetramine, tetraethylene pentamine, hexamethylene diamine, 1,3-diaminopropane, hydroxyethyl ethylene diamine, ethanolamine, diethanolamine, cyclohexylamine, piperazine, amino ethyl piperazine, morpholine, N-methyl benzylamine, ethylbenzylamine, 2,4-dichlorobenzylamine, N-methyl-3,4-dichlorobenzylamine, N-methyl 2,4,5-trichlorobenzylamine, and aniline. Reaction with aniline, however, was very slow and with evidence of decomposition.

In general, any amino compound may be employed, having at least one primary or secondary amino group, and regardless of the isomeric position of the halo substituent if present.

EXAMPLE 4

The products of the above amino derivatives of 2,4,5-trichloroaniline were subjected to microbiological testing according to the following methods:

For antimicrobial evaluation of certain of the above compounds, the Standard Broth Inhibition test method was employed. Aliquots of the test materials were added to appropriate broth culture media contained in test tubes so that various concentrations of the test material in culture media were obtained. The tubes so prepared were inoculated with either 24-hour broth cultures of the test bacteria, or 14-day aqueous spore suspensions of the test fungi, or 7-day broth cultures of the algae. The inoculated tubes were incubated as follows: bacteria for 72 hours at 37° C.; fungi for 14 days at 28° C; algae for 7 days at 25° C. Following the aforementioned incubation period, the tubes were examined for the presence or absence of macroscopic growth. The lowest concentration of test material in the broth which does not permit macroscopic growth is designated as the "Minimum Inhibitory Level."

In the following tables, these abbreviations of the designations of the organisms are employed: S.a. = *Staphylococcus aureus*; E.c. = *Escherichia coli*; S.f. = *Streptococcus faecalis*; Ps. a = *Pseudomonas aeruginosa*; A.n. = *Aspergillus niger*; P.e. = *Penicilium expansum*; C.p. = *Chlorella pyrenoidosa*.

Table 1 (in parts per million of product)

| Product | Gram Negative E.c. | Gram Negative Ps.a. | Gram Positive S.a. | Gram Positive S.f. | Fungi A.n. | Fungi P.e. | Algae C.p. |
|---|---|---|---|---|---|---|---|
| Example 1 | 25 | 1,000 | 25 | 250 | 500 | 500 | 10 |
| Example 2 | 100 | 250 | 100 | 100 | — | — | — |

The products may be effectively used to control the proliferation of microorganisms in both recirculated water and in process water.

EXAMPLE 5

0.5 percent by weight of trichloroaniline derivatives was dissolved in a medium of acetone and water. A stock soap solution was first prepared in 10 percent concentration. Ten parts of this, 62.5 parts of acetone, 27 parts of distilled water and 0.5 parts of the product were mixed.

0.5 percent solutions of the same were prepared, but substituting 10 parts of distilled water for the soap solution, as a control.

The bacteriostatic levels were determined on the "Soap" and "No Soap" solutions, and are given in the following table in terms of parts per million of product, and of "Growth/No growth."

Table 2

| Product of | Soap S.a. | E.c. | No Soap S.a. | E.c. |
|---|---|---|---|---|
| Example 1 | 10/25 | 10/15 | 10/25 | 10/25 |

The effectiveness of the trichloroanilino compounds as soap bacteriostat is clearly shown above, and also in the following test. This is especially significant since it is notorious that most soap bacteriostats are not very active against gram negative bacteria.

EXAMPLE 6

Sterile soap solution was prepared at 2.5 percent soap solids; trichloroanilino derivative was added to aliquots of this at 0.1 percent by weight, or 1,000 parts per million in the solution, and at a soap to product ratio of 25:1. For purpose of comparison, Phisohex, (a proprietary product of Winthrop Laboratories, division of Sterling Drug, Inc.) containing surface-active agents and 3% of 2,2'methylene-bis (3,4,6 trichlorophenyl) was diluted with distilled water, also at the 1,000 p.p.m level of bacteriostatic agent.

100 ml aliquots of the respective solutions were transferred to Erlenmeyer flasks maintained at 25° C. and were inoculated with 1 ml of an aqueous suspension of a 24-hour agar growth of, respectively, Staphyloccus aureus and Escherichia coli.

At intervals of 3 and 5 minutes after inoculation, aliquots of each of the solutions were plated into nutrient agar to determine the number of surviving bacteria. The number of survivors after 5 minutes was compared with the number initially present, from which figures the percent of organisms killed was computed. The following percentages are the average of replicate counts.

Table 3

Per cent of Organisms Killed in 5 Minutes

| Product | S. aureus | E. coli |
|---|---|---|
| "Phisohex" | 98.0325% | 94.3325% |
| Example 1 | 97.4950% | 97.0642% |

EXAMPLE 7

The present compounds are equally effective in synthetic detergents such as the fatty alcohol sulfates, the ether sulfates and the alkyl aryl sulfonates. The Maprofix WA series and the Maprofix TLS series (Onyx Chem. Co.) are representative of the fatty alcohol sulfates; Maprofix ES (Onyx Chem. Co.) is representative of the ether sulfates; and Ultrawet L60 (ARCO Chem. Co.) is representative of the alkyl aryl sulfonates. Both the soaps and synthetic detergents are effective in proportions of between about 20/1 and 100/1 of the soap or detergent relative to the aniline compound.

EXAMPLE 8

The 3-(2,4,5-trichloroanilino)-1,1-dimethylamino propane of Example 1 was added at levels of 1.0 percent and 0.5 percent by weight, respectively, to Antara LM 500 (a triethanolamine salt of a complex organic phosphate ester produced by General Aniline and Film Corp.) and to Mahogany Sulfonate (a petroleum sulfonate produced by Humble Oil and Refining Co.), both being examples of metal-working fluids.

These were then diluted, one part of lubricant to 24 parts of water; the preservative was therefore present at the 200 p.p.m. and 400 p.p.m levels in the diluted fluid.

In each case, a blank was prepared in the same manner, but without the preservative compound.

A series of 24-hour broth cultures of Escherichia coli, Staphylococcus aureus, Pseudomonas aeruginosa, Bacillus species, Proteus species and Aerobacter aerogenes were pooled, diluted with sterile broth and inoculated into 100 ml volumes of the above samples, each contained in a sterile, wide-mouth 4-ounce jar, to provide from 1 to 10 × 10⁶ bacteria cells per ml of prepared fluid.

At weekly intervals, up to 5 weeks after the original inoculation, the samples were examined to determine the viable organisms present. At the 5 week point, each jar was reinoculated with the culture as initially and the testing was continued for a total period of 9 weeks. The counts are given in the following table, in which "Phosphate" represents the Antara LM 500 and "Sulfonate" represents the Mahogany Sulfonate.

The counts are to be multiplied by $10^3$.

Table 4

3-(2,4,5-trichloroanilino)-1,1-dimethylaminopropane

| Fluid Comp'n. | Agent p.p.m. | Weeks 0 | 1 | 2 | 3 |
|---|---|---|---|---|---|
| Phosphate | 0 | 4,200 | 23,000 | 18,300 | 14,200 |
| " | 200 | 4,200 | 900 | 320 | 470 |
| Sulfonate | 0 | 4,200 | 22,000 | 16,500 | 12,900 |
| " | 400 | 4,200 | 1,000 | 0.20 | 0.194 |
| " | 0 | 3,700 | 5,800 | 2,080 | 1,760 |
| " | 200 | 3,700 | 960 | 278 | 300 |

| | | Weeks 4 | 5 | 7 | 9 |
|---|---|---|---|---|---|
| Phosphate | 0 | 12,600 | 11,800 | 10,000 | 6,300 |
| " | 200 | 360 | 281 | 730 | 440 |
| Sulfonate | 0 | 13,100 | 12,800 | 13,400 | 9,600 |
| " | 400 | 4.20 | 3.00 | 860 | 460 |
| " | 0 | 1,570 | 1,630 | 1,800 | — |
| " | 200 | 360 | 270 | 209 | — |

The term "metal-working fluids," as used herein are those discusses in "Metalworking Lubricants," E.L.H. Bastian, McGraw Hill Co., 1951, pp. 5–56. The present compounds have biocidal utility when intermixed in biocidally effective amounts with fluids such as disclosed in this publication.

The products of this invention are also effective preservatives against microbial growth and action in cosmetic preparations such as creams, lotions, shampoos, and the like, when present therein in a proportion of about 0.25 to 2 percent by weight of the composition.

The invention claimed is:

1. A biocidal metal-working fluid containing a microbiocidally effective amount of a compound having the structure:

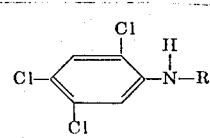

wherein R is the residue remaining after 1, 2, 4, 5-tetrachlorobenzene has been reacted with a compound selected from the group consisting of ethylamine, hexylamine, octylamine, nonylamine, decylamine, dodecylamine, tetradecylamine, hexadecylamine, octadecylamine, octadecenylamine, diethylene triamine, triethylene tetramine, tetraethylene pentamine, hexamethylene diamine, 1,1-dimethylaminopropane, 1,3diaminopropane, hydroxyethyl ethylene diamine, ethanolamine, diethanolamine, cyclohexylamine, piperazine, aminoethyl piperazine, morpholine, N-methyl benzylamine, ethylbenzylamine, 2,4-dichlorobenzylamine, N-methyl-3,4-dichlorobenzylamine, N-methyl-2,4,5-trichlorobenzylamine, and aniline.

* * * * *